May 22, 1934.  G. WÜNSCH  1,959,890
MEANS FOR LIQUID LEVEL CONTROL
Filed Feb. 19, 1931  2 Sheets-Sheet 1
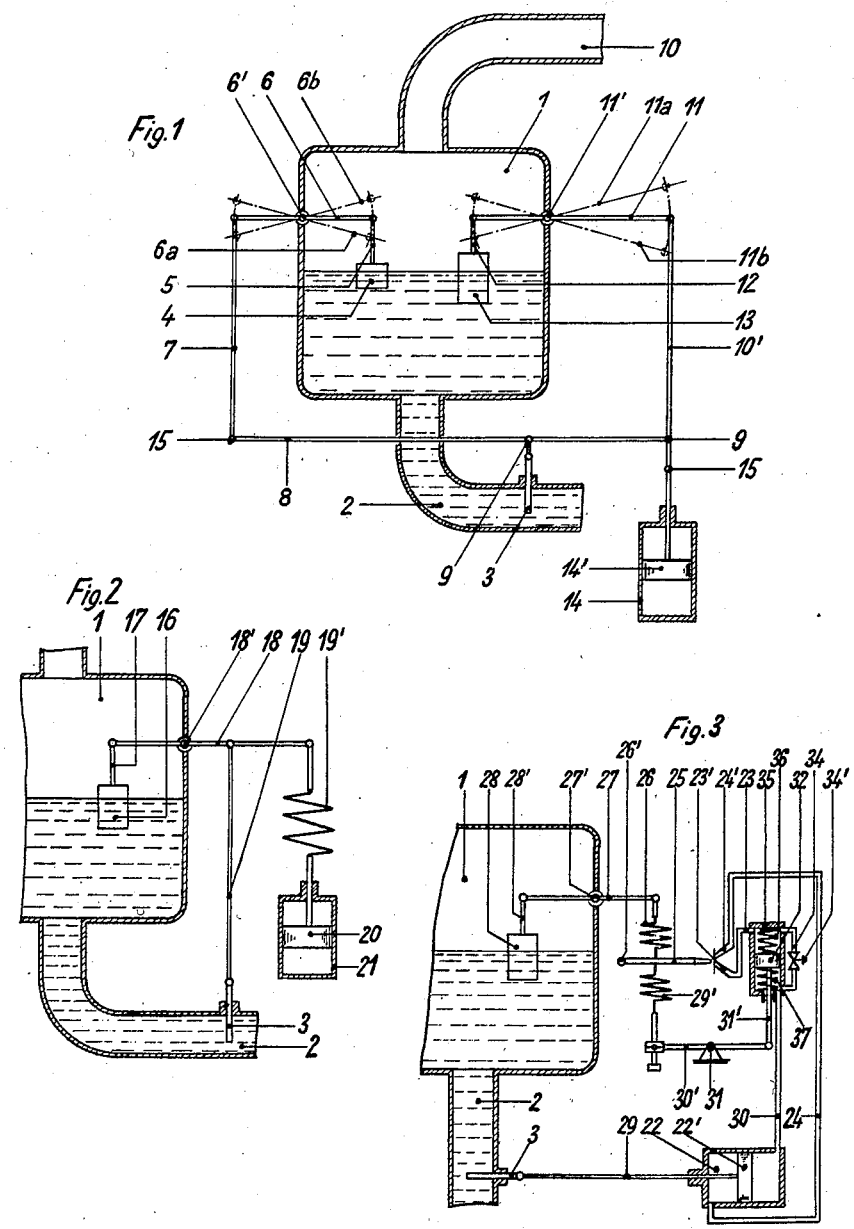
Inventor
Guido Wünsch
by Edward H. Palmer
Atty.

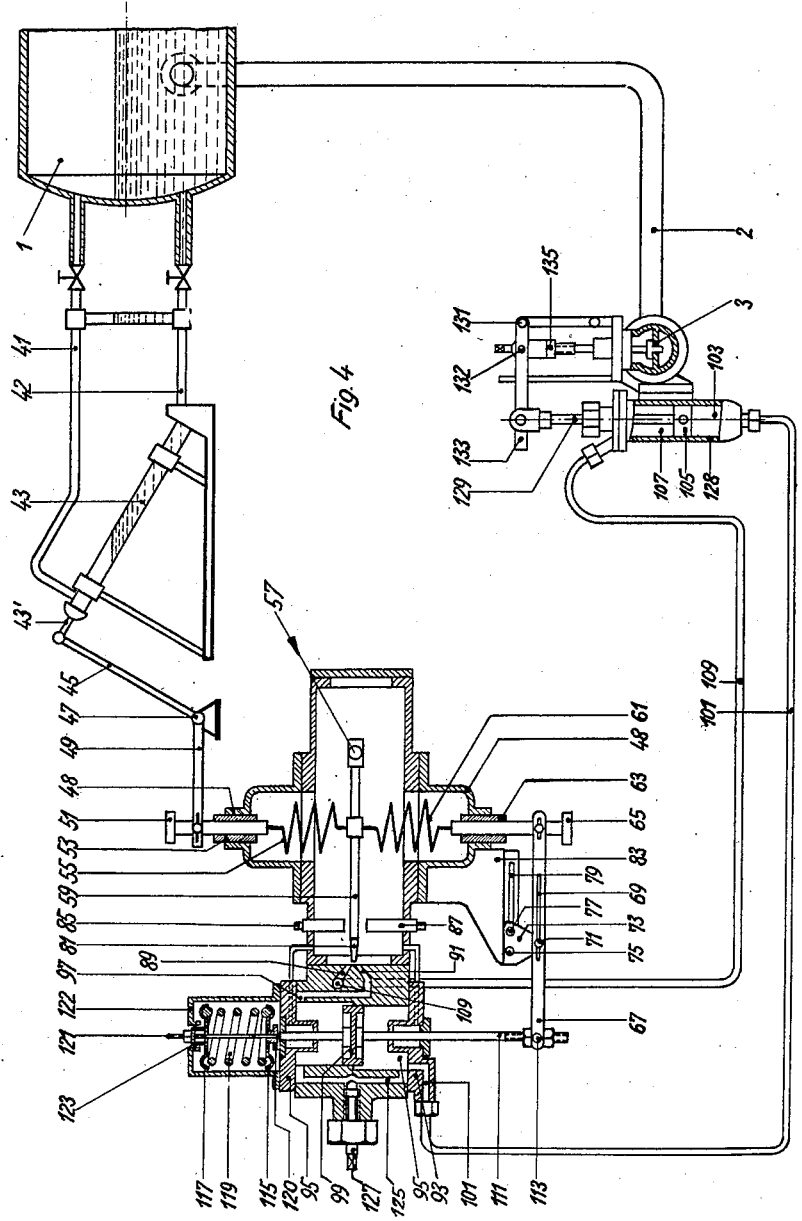

Patented May 22, 1934

1,959,890

UNITED STATES PATENT OFFICE 1,959,890

MEANS FOR LIQUID LEVEL CONTROL

Guido Wünsch, Berlin-Steglitz, Germany, assignor to Askania-Werke Aktiengesellschaft, Berlin-Friedenau, Germany, a corporation of Germany Application February 19, 1931, Serial No. 516,939
In Germany February 20, 1930

3 Claims. (Cl. 122—451)

This invention has for its object a novel apparatus for regulating or governing the level of liquids in liquid containers, and more particularly the water line or level in steam boilers.

The invention and its aims and objects will be best understood from the following description of said method and of specific forms of apparatus embodying said invention and given by way of illustration, considered in connection with the accompanying drawings, the true scope of the invention being set forth in the appended claims.

In the drawings:

Fig. 1 illustrates diagrammatically one illustrative mode or manner of carrying out the invention;

Fig. 2 illustrates diagrammatically another illustrative mode or manner of carrying out the invention;

Fig. 3 illustrates diagrammatically an illustrative mode or manner of carrying out the invention more specifically shown in Fig. 4; and Fig. 4 is a side elevation, partly in section of a complete illustrative form of apparatus for carrying out the invention.

In water-level regulating or governing means heretofore used for steam boilers, a valve in the water feed is usually controlled by measuring means, controlled or operated in turn in any suitable manner by the water level in the boiler. The method generally used is that of irregular regulation, wherein instead of maintaining a constant water level in the boiler the arrangement and operation are such that when the feed valve is fully open a lower water level exists in the boiler than when said valve is fully closed, that is to say the water level varies according to the load in such manner that the greater the load the lower the water level.

The method of irregular regulation has much to recommend it when applied to steam boilers. In the case of a sudden increase in the load, the water wells up more strongly in the boiler in consequence of the decrease in pressure on the water surface, the increased steam bubble formation resulting in a rise in the water level, while on the other hand the regulating or governing means operates to produce a lower water level. The steam boiler is therefore in position if called upon instantly to deliver a greater quantity of steam without the need of additional heating. This would not be the case where the water level in the boiler regulated absolutely uniformly, for in that case an increased steam consumption would result immediately in a greater water feed, so that the required increased amount of steam could be produced only by increased heating.

On the other hand, the method of irregular regulation has the following disadvantages: The highest water level to which the water is adjusted in the boiler by the regulating or governing means in the case of lowest steam consumption must in no case exceed, nor must the lowest level to which the water is adjusted in the boiler by said regulating or governing means in the case of greatest steam consumption, fall below the maximum and minimum level respectively, consistent with the safety of the boiler. With the boiler operating under full load it would therefore not be in position to handle a still higher load for a short time, as in that case the water level would fall below that desirable so that the safety of the boiler would be endangered. One is therefore compelled to construct and arrange the boiler plant in such manner that when the boiler is operating under full load it shall not be subjected to additional loads even of short duration, or else the water level regulating means must be so arranged that the degree of irregularity (that is to say the difference between the highest water level that would be determined when the steam consumption is lowest and the feed valve is completely closed, and the lowest water level determined when the steam consumption is greatest and the water feed valve is fully open) shall be smaller than the difference between the maximum and minimum desirable water level corresponds to. In the latter case however the above referred to advantage of the storing up capacity of the boiler cannot be fully utilized, because it will be apparent that the quantities of steam which the boiler can deliver in response to a sudden increased demand will be the greater the lower the level of the water sinks to with a wider open feed valve.

The present invention enables the storing up capacity of a boiler to be utilized to the full while avoiding all the disadvantages of irregular regulation as heretofore used. It rests upon the fact that while the regulating or governing means, in accordance with the invention, responds with strong irregularity to demands of short duration, additional or cooperating means is provided which gradually compensates or equalizes the irregularity, whereby the water level in the boiler may be adjusted on the average to the same height at each load. In fact the boiler may be caused to operate with a higher water level in the case of maximum steam consumption than in the case of lesser steam consumption. Owing to the fact that the irregularity with which the regulator or governing means adjusts the water level in response to short load variations is gradually compensated or equalized, or even over compensated or equalized, the storing up capacity of the boiler can be utilized much more fully than has heretofore been possible. In water level regulating or governing methods heretofore used, the difference between high water level as adjusted by said regulating or governing means, when the steam demand is lowest, and the low water level as adjusted by said regulating or governing means when the steam demand is highest, must not exceed or fall below the maximum or minimum water level respectively consistent with safety, otherwise the safety of the boiler would be in danger. Experience in boiler operation has shown however that load increases of short duration never reach 25% of the full load. Since, in accordance with the present novel regulating or governing method, the mean water level is always gradually restored independently of the load; it is quite possible so to organize the regulator or governing means that the degree of irregularity which would be determined in the absence of the additional slowly operating compensating or equalizing means, shall reach about twice the difference between the maximum and minimum water level permissible without endangering the boiler. The storing up capacity of the boiler can thus be utilized to much better advantage than heretofore, because in the case of a sudden application of a load, the entire water mass, equal to the difference between the actual water level and the level to which the water would be adjusted by the regulator or governing means, is available for conversion into steam without increased or additional heating.

Referring to Fig. 1, wherein an illustrative embodiment of the invention is diagrammatically represented, a boiler 1 is supplied with water through a supply pipe 2 in which is provided water supply controlling means, specifically a valve 3, for controlling the water supply. The valve 3 is controlled by any suitable means such as a float 4 which floats on the water in the boiler and is rendered operative by variations in the water level in the boiler to actuate the operating mechanism of said valve, comprising a link 5, lever 6, link 7 and lever 8, the latter pivoted or having its fulcrum at 9. The link 5 is connected at one end to said float and at its other end to the lever 6 pivoted at 6'. The other end of the lever 6 is pivotally connected to one end of the link 7, the other end of which is pivoted to the free end of the lever 8. The valve member 3 is suitably connected at 9' to the lever 8.

If a considerable amount of steam be withdrawn from the boiler through the steam pipe 10, the water level in the boiler will drop and the resultant downward movement of the float 4 will turn the lever 6 into substantially the dotted line position 6a. This movement of the lever 6 acting through the link 7 and lever 8 will raise the valve member 3 and correspondingly increase the valve opening. On the other hand, upon a decrease in the demand or consumption of steam, entailing a corresponding rise of the water level in the boiler, the float 4 will be raised and the lever 6 turned about its fulcrum into substantially the dotted line position 6b, which through link 7 and lever 8 will correspondingly close the valve 3. It will thus be seen that the float 4 assumes a lower position in the case of heavy steam withdrawal, with the valve 3 wide open than in the case of a lesser steam withdrawal and a closed valve 3. The float 4, therefore, controls or governs the water level in the manner heretofore used. As shown in Fig. 1, however, the fulcrum 9 of the lever 8 is not fixed but is located upon a link 10', the other end of which is pivotally connected to one end of a lever 11 having its fulcrum at 11' and its other end suitably connected by a link 12 to a float 13. It will also be noted that damping or retarding means of any suitable construction are provided, said means comprising for example a cylinder 14 containing a suitable liquid in which is immersed a piston 14' having a small perforation (not shown) and pivotally connected at 15 to the lower end of the link 10'.

When the water level in the boiler drops, carrying with it the float 4, the float 13 also tends to drop and thus by rotating the lever 11 about its fulcrum 11' and acting through the link 10' and lever 8 tends to rotate the latter about its pivotal point 15 to open the valve 3. On account of the connection of the link 10' to the damping or retarding means 14 however, this downward movement of the float 13 and consequent opening of the valve 3 can be effected only very gradually. While the ratio of the two arms of the lever 6 is determined in such manner that the difference between the fully opened valve 3 and said valve when completely closed (the fulcrum 9 of the lever 8 remaining stationary) corresponds to a very considerable difference in level of the float 4, the ratio of the arms of the lever 11 is determined in such manner that, with the pivotal point 15 of the lever 8 stationary, the difference between the fully opened and fully closed valve 3 represents only a very small difference in the level of the float 13. This illustrative embodiment of the invention therefore operates as follows.

When the water level in the boiler drops in response to a sudden increase in the steam demand or consumption, the float 4 falls with the water level, while the float 13 cannot immediately respond to the drop in the water level owing to the action of the damping or retarding means 14. The drop of the float 4 effects a corresponding opening of the feed valve 3 and the water in the boiler is adjusted to a correspondingly lower level. The damping means 14 however yields gradually and the float 13 begins to drop in conformity to said lower water level gradually arriving in substantially the dotted line position 11a. The supply valve 3 is thus slowly opened still more so that the lower water level to which the water in the boiler is adjusted by the float 4 gradually rises and within a suitable time a normal water level will be established.

In the illustrative embodiment diagrammatically represented in Fig. 2, a float 16 is pivotally connected by a link 17 to one end of a lever 18 having its fulcrum at 18'. To the other arms of said lever is pivotally connected one end of a link 19 having its lower end suitably connected to the valve member 3 of the water feed valve of the boiler. At its right end, viewing Fig. 2, said lever 18 is connected by a spring 19' to a perforated piston 20 working in a cylinder 21 and in a suitable liquid contained in said cylinder, the construction constituting a damping or retarding means similar to that of Fig. 1. When the water level in the boiler drops in response to an increased steam demand, the float 16 drops with the water level, the spring 19' yielding, and through lever 18 and link 19 opens the valve 3 wider. Spring 19' is thus tensioned since the piston 20 cannot immediately move upwardly owing to the restraining or retarding action of the liquid, oil for example, in which it is immersed. The water in the boiler will thus first be adjusted to a level below that of its former level. As the oil passes gradually through the opening (not shown) in the piston 20 from its upper to its lower side, said piston moves upwardly gradually in the cylinder 21, thus permitting the float 16 slowly to drop still farther. This opens the valve 3 still more so that the water level in the boiler rises gradually and the lower level to which the water was first adjusted by downward movement of the float 16 is again gradually raised. This regulator therefore also produces a great irregularity in the case of short variations, said irregularity being gradually reduced or compensated.

In the illustrative embodiment of the invention diagrammatically represented in Fig. 3, a servo-motor is conveniently used to operate the water supply valve 3. Referring to said figure, a float 28 is suspended within the boiler by a link 28' from the end of a lever 27 having its fulcrum at 27'. The opposite end of the lever 27 is connected by a spring 26 to a pressure fluid supply member or nozzle 25, pivoted at 26' to a fixed part of the apparatus. Any suitable fluid under pressure, such as air or oil, is continuously supplied to said nozzle from a suitable source not shown and is continuously discharged in the form of a jet from its discharge opening. Facing said discharge opening are two contiguous ports 23' and 24', the former communicating with a passage 23 and the latter with a passage 24. The one or the other of said ports will be supplied with more fluid from said nozzle according to the direction in which said nozzle is swung on its pivot 26'.

A cylinder 22 contains a piston 22', the piston rod 29 of which is suitably connected to the valve member 3 of the water supply valve in the water conduit 2. The passage 23 opens into one end of a cylinder 35, while the passage 24 opens into the cylinder 22 at its left end viewing Fig. 3. A passage 30 leads from the right end of cylinder 22 to the end of cylinder 35 opposite to that with which the passage 23 communicates. A spring 29' connects the nozzle 25 to one end of a lever 30' having its fulcrum at 31 and its other end pivotally connected to the end of a piston rod 31' of a piston 32 working in the cylinder 35. Springs 36 and 37 interposed between the end walls of the cylinder 35 and the piston 32 tend to maintain the latter in a position substantially equidistant from the cylinder's two ends. Fluid pressure equalizing means are provided, said means herein comprising a by-pass 34 connecting the chambers at opposite sides of the piston 32 and which may be controlled by a throttle valve 34'.

If, in response to a greater steam withdrawal, the water level and consequently float 28 drop in boiler 1, the lever 27 will be turned contra-clockwise about its fulcrum 27' and through spring 26 will swing nozzle 25 about its pivot 26' in a contra-clockwise direction. Said nozzle will therefore inject more fluid into the port 24' than into the port 23', thus increasing the pressure on the left side of piston 22' of cylinder 22 and decreasing the pressure on the upper side of piston 32 in cylinder 35. Piston 22' will thus move to the right and through its rod 29 will increase the opening of the water feed valve 3, and oil or other fluid in cylinder 22 at the right of the piston 22' will be driven through passage 30 into the lower chamber of cylinder 35, thus moving the piston 32 upwardly in said cylinder. This swings lever 30' contra-clockwise about its fulcrum 31 and tensions spring 29'. The latter thus tends to return the nozzle 25 to its median position relative to the two ports 23' and 24' which will occur when springs 26 and 29' are equally tensioned. As soon as nozzle 25 has been returned to its median position, the pressure will be equalized upon opposite sides of piston 22' and the valve member 3 will come to rest in this position. As spring 29' is now under greater tension, the float 28 must assume a lower position than before in order to maintain nozzle 25 in its median position relative to the two ports 23' and 24'. With the above arrangement therefore, a greater steam withdrawal of short duration adjusts the water in the boiler at a lower level.

If on the other hand the steam consumption drops suddenly, the feed water will rise in the boiler 1, thus raising float 28 which through lever 27 compresses the spring 26 and seeks to turn the nozzle 25 about its fulcrum 26' in a clockwise direction. More oil will thus be injected into port 23' and into port 24', and pressure in cylinder 35 above piston 32 will increase while pressure in cylinder 22 at the left of piston 22' will decrease. Piston 32 thus moves downwardly and forces oil below it into cylinder 22 through passage 30, thus moving piston 22' to the left and closing the water feed 3. Downward movement of piston 32 swings lever 30' about its fulcrum in clockwise direction, thus compressing spring 29' more than before. When as a consequence the level of the water in the boiler 1 begins to drop on account of the closing of the valve 3, the nozzle 25 assumes its median position, the float 28 being in a higher position than before. A lesser steam withdrawal thus adjusts the water in the boiler at a higher level.

Referring to cylinder 35 it will be noted that springs 36 and 37 tend to return the piston 32 to its middle position in said cylinder, and as the oil that is below and above the piston 32 can gradually equalize itself through the by-pass 34, piston 32 will thus gradually be returned to its middle position in said cylinder. Spring 29' will thus be returned to normal tension and nozzle 25 will be swung about its fulcrum contra-clockwise in the case of increased steam consumption and clockwise in the case of diminished steam consumption, thus producing in the first case a still wider opening and in the second case a still greater closing of the valve 3, and this movement will come to rest only when the float 28 has attained its original height. Both the lower level to which the water is adjusted in response to an increased steam demand, and the higher level to which the water is adjusted in response to a lesser steam demand, will thus be gradually equalized or compensated.

Instead of a float or floats any other suitable means may be used within the scope of the invention. In Fig. 4, for example, there is shown water level governing apparatus in which means expansible and contractible in response to variations in temperature is used, said means herein consisting conveniently of a tube 43 having a high coefficient of expansion and contraction in response to variations in temperature. The water is supplied to the boiler 1 through a feed pipe 2 controlled by a feed valve 3, the water level of the boiler being adjusted by varying the opening of the valve 3. Tube 43 communicates at one end through a pipe 42 with the water in the boiler, and at its other end by pipe 41 with the space in the boiler above the water, said tube 43 being inclined to the horizontal substantially as shown.

It will be apparent that tube 43 will contain water at the same level as that of the water in the boiler and that the space above the water level in said tube will contain steam which condenses continuously. As condensation of the steam liberates heat, the expansion of the tube 43 will be the greater the lower the water level in said tube and consequently in the boiler. The length of tube 43 is therefore a measure of the water level within the boiler.

The upper free end of the tube 43 is pivotally connected by a rod 43' to an arm 45 of a bell crank lever fulcrumed at 47 upon a fixed part of the apparatus and having its other arm 49 pivotally connected to a rod 51 slidably mounted in a box 53 extending through the wall of the casing 48 of the apparatus. The lower end of the rod 51 is connected by a spring 55 to a pressure fluid supplying member or nozzle 59 pivoted at 57 and continuously supplied in any suitable conventional manner and from any suitable source (not shown) with suitable fluid, preferably air or oil, under pressure. A second spring 61 to act in opposition to spring 55, connects said nozzle with the upper end of a rod 65 slidably mounted in a box 63 extending through the wall of the casing 48. The lower end of rod 65 is pivotally connected to one end of a lever 67 having its fulcrum at 71.

The discharge end 81 from which pressure fluid is continuously discharged from nozzle 59 is adapted to oscillate in front of the two contiguous ports 89, 91, its movement being limited by stops 85, 87. Ports 89 and 91 are provided in the side wall 93 of a cylinder 95, the port 91 opening into a passage 97 communicating with the chamber above the piston 99 in cylinder 95, while port 89 communicates with passage 109 opening into the upper chamber 107 above the piston 128 of cylinder 105. Chamber 95' below the piston 99 in cylinder 95 communicates by a passage 101 with chamber 103 below piston 128 of said cylinder 105. Piston rod 111 is pivotally connected at its lower end to lever 67 at 113, its upper portion 121 extending through a suitable packing in the cylinder head and having slidably mounted upon its upper reduced end portion outside the cylinder head two plates 115, 117 held in spaced relation by a spring 119 interposed between them, the plate 115 resting upon collar 118 having a sliding fit upon said reduced portion and adapted to be engaged by the piston rod shoulder 120 when the piston moves upwardly. Plate 117 abuts against nut 123 screw threaded upon the reduced end of said piston rod. Means is provided to prevent plates 115, 117 from yielding laterally upon compression of spring 119, said means herein comprising a housing 122 or a suitable yoke may be used.

Fluid pressure equalizing means are provided, herein conveniently comprising a by-pass 125 connecting the chambers at opposite sides of piston 99, said by-pass may be controlled by a throttle valve 127. Piston 128 of cylinder 105 is connected by its rod 129 to a lever 133 fulcrummed at 131 and having pivoted thereto at 132 spindle 135 of feed valve 3 controlling the water feed through conduit 2 from any water supply not shown.

This illustrative form of fluid level regulating or governing apparatus operates as diagrammatically represented in Fig. 3. With nozzle 59 in its median position relative to the two ports 89 and 91, both of these ports will be supplied equally with pressure fluid from said nozzle. If the water level in the boiler 1 drops in response to a greater steam demand there will be a proportionate drop in the water level in the extension tube 43, with the result that the latter will expand for the reasons above given. The bell crank lever 45—49 will be turned upon its fulcrum in a contra-clockwise direction and through the rod 51 will compress spring 55 thus swinging nozzle 59 upon its fulcrum 57 in contra-clockwise direction. More fluid under pressure will thus be injected from the nozzle point 81 into port 91 and less into port 89, thus increasing the pressure above piston 99 in cylinder 95 and decreasing the pressure above piston 128 in cylinder 105. Piston 99 will thus be moved downwardly, oil below piston 99 being injected into the chamber below piston 128 of cylinder 105, thus raising said piston and through lever 133 and spindle 135, opening valve 3 wider. In the meantime the downward movement of piston rod 111 will swing lever 67 contra-clockwise about its fulcrum 71, thus increasing the compression of spring 61 by rod 65, said spring thus tending to swing nozzle 59 back again about its fulcrum 57. If the tension of spring 61 were increased the nozzle 59 would come to rest in its median position relative to ports 89 and 91, thus supplying each equally with fluid under pressure. As in this position, spring 61 is more strongly compressed than formerly, spring 55 is also correspondingly more strongly compressed, consequently if bell crank lever 45, 49 be turned still more, i. e. if tube 43 undergoes a still greater expansion, i. e. if the water level in boiler 1 be lowered still more, nozzle 59 will occupy its median position relative to the two ports 89 and 91.

But in moving downwardly piston 99 through its rod 121 and nut 123 carried downwardly plate 117 thus compressing spring 119. In consequence of the gradual equalizing of the spaces below and above the piston 99 by reason of the equalizing flow of fluid by one space to the other through by-pass 125, spring 119 gradually returns piston 99 to its median position in its cylinder. This however diminishes the tension of spring 61, thus swinging nozzle 59 again in a contra-clockwise direction about its fulcrum 57. Port 91 thus receives more fluid under pressure than port 89 with the result that pressure is increased above piston 99 and below piston 128, so that feed valve 3 will be gradually opened wider and the original water level will be gradually restored.

If on the other hand the water level in the boiler rises in response to a sudden drop in steam consumption, the reverse operation takes place. It will thus be seen that the arrangement described also produces gradually in the course of a longer period of time a perfectly uniform regulation of the water level in the boiler, while in response to variations of short duration, regulation can be instantly effected with great irregularity.

It will be noted that pin 71 forms the fulcrum of lever 67 and preferably engages a longitudinal slot 69 in said lever, said fulcrum 71 being carried by a plate 73 provided with two pins 75 and 77 engaging a longitudinal slot 79 provided in a fixed bracket 83. This arrangement permits sliding movement of the plate 73 variably to adjust the position of the fulcrum 71 of lever 67 longitudinally of said lever. The ratio of the two arms of lever 67 and therefore the restoring action of spring 61 on nozzle 59 may thus be adjusted as desired.

I am aware that the invention may be embodied in other specific forms without departing from the spirit or essential attributes thereof; and I therefore desire the present embodiment to be considered in all respects as illustrative and not restrictive, reference being had to the appended claims rather than to the foregoing description to indicate the scope of the invention.

I claim:

1. In apparatus for regulating or governing the level of liquids in containers, more particularly the water level in steam boilers, in combination, water supply controlling valve means; means comprising a pressure fluid operated servo-motor for operating said valve means to open and close the same; a cylinder; a fluid pressure supply member for said servo-motor and cylinder, operable to control the operation of said motor; means operable in response to water level variations to operate said fluid pressure supply member; a piston working in said cylinder and operatively connected to said pressure fluid supplying member; means to equalize the fluid pressure upon opposite sides of said piston; and resilient means acting upon opposite sides of said piston, whereby said piston exerts a restoring action upon said fluid pressure supplying member.

2. Apparatus for regulating or governing the water level in boilers or the like, comprising, in combination, a plurality of floats movable responsive to variations in the level of the water in the boiler to effect a regulating action; means to retard said responsive movement of one of said floats; and means to govern the supply of water to the boiler controlled by the combined regulating action of said floats.

3. Apparatus for regulating or governing the water level in boilers comprising, in combination, means responsive to water level variations in the boiler due to variations of the load to produce a regulating effect such that a low level corresponds to a relatively heavy load and a high level to a relatively light load; means responsive to water level variations in the boiler to produce a gradual regulating effect in modification of that produced by said first named means; and a water feed regulator for the boiler comprising a pressure fluid jet nozzle controlled by said two regulating effect producing means and actuating a control for the water feed.

GUIDO WÜNSCH.